United States Patent
Venne et al.

(10) Patent No.: US 12,525,911 B2
(45) Date of Patent: Jan. 13, 2026

(54) SYSTEM AND METHOD FOR OPERATING VARIABLE FREQUENCY DRIVE USING AC-POWER SOURCE IN TRANSPORT REFRIGERATION UNIT

(71) Applicant: Carrier Corporation, Palm Beach Gardens, FL (US)

(72) Inventors: Samuel Venne, Brewerton, NY (US); Parmesh Verma, Manlius, NY (US); Christopher Repice, Camillus, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 195 days.

(21) Appl. No.: 18/466,969

(22) Filed: Sep. 14, 2023

(65) Prior Publication Data
US 2024/0097592 A1    Mar. 21, 2024

Related U.S. Application Data

(60) Provisional application No. 63/375,928, filed on Sep. 16, 2022.

(51) Int. Cl.
*H02P 6/28* (2016.01)
*F04D 25/06* (2006.01)
*H02P 27/04* (2016.01)

(52) U.S. Cl.
CPC .............. *H02P 27/04* (2013.01); *F04D 25/06* (2013.01)

(58) Field of Classification Search
CPC .. H02P 27/04; F04D 25/06; B60H 2001/3292
See application file for complete search history.

(56) References Cited

U.S. PATENT DOCUMENTS 8,096,139 B2   1/2012   Taras et al.
8,756,947 B2   6/2014   Chen et al.
(Continued)

FOREIGN PATENT DOCUMENTS

EP   3974217 A1   3/2022
GB   2595970 A    12/2021
(Continued)

OTHER PUBLICATIONS

Extended European Search Report received for EP Application No. 23196950.2, mailed on Mar. 13, 2024, 16 Pages.
(Continued)

*Primary Examiner* — Muhammad S Islam
(74) *Attorney, Agent, or Firm* — Drew Folgmann

(57) ABSTRACT

A system in a transport refrigeration unit (TRU) for driving a compressor and/or fan(s) of the TRU by a variable frequency drive (VFD) that is operable using AC power comprises the VFD operatively connected between the compressor and one or more ac power source such as an engine-generator assembly of the TRU and/or an electrical grid. The same VFD or a different VFD is also operatively connected between the AC power source and fan(s) associated with an evaporator, and a condenser of the TRU. The VFD is configured to be operated by the AC power sources. The VFD is operable to receive a 3-phase AC power ranging from 200 to 650 volts and 0.25 to 25 KW from at least one of the AC power source, convert the received 3-phase AC power to supply AC or DC power to a motor associated with the compressor and/or the fan(s).

20 Claims, 3 Drawing Sheets

(56) References Cited

U.S. PATENT DOCUMENTS

| | | |
|---|---|---|
| 9,194,286 B2 | 11/2015 | Burnham et al. |
| 9,776,473 B2 | 10/2017 | Kolda et al. |
| 10,240,847 B1 | 3/2019 | Thomas, Jr. |
| 11,072,321 B2 | 7/2021 | Wenger et al. |
| 11,155,143 B2 | 10/2021 | Adetola et al. |
| 11,260,723 B2 | 3/2022 | Schumacher et al. |
| 2009/0056354 A1 | 3/2009 | Davis et al. |
| 2011/0162395 A1 | 7/2011 | Chakiachvili et al. |
| 2013/0334998 A1* | 12/2013 | Osman ............... H02P 1/52 318/503 |
| 2015/0184912 A1 | 7/2015 | Nelson et al. |
| 2016/0172935 A1* | 6/2016 | Mountain ............ H02P 27/04 310/68 D |
| 2018/0248500 A1* | 8/2018 | Hawes ................ G01R 31/343 |
| 2018/0351497 A1* | 12/2018 | Osman ............... H02P 21/00 |
| 2019/0152297 A1 | 5/2019 | Chopko et al. |
| 2020/0180496 A1 | 6/2020 | Burchill et al. |
| 2021/0221195 A1 | 7/2021 | Ducher |
| 2022/0194175 A1 | 6/2022 | Radke et al. |
| 2022/0357087 A1* | 11/2022 | McGill ................ F04D 27/004 |

FOREIGN PATENT DOCUMENTS

| | | |
|---|---|---|
| WO | 2018204591 A1 | 11/2018 |
| WO | 2021244832 A1 | 12/2021 |

OTHER PUBLICATIONS

Kingclima, "Zero Emission Transport Refrigeration Units", Aug. 31, 2022, pp. 1-4, www.truckfrigo.com/products/refrigeration-units/electirc-refrigeration-units, Henan Kingclima Industry Co, Ltd.

Thermo King, "Thermo King Launches All-Electric Refrigeration Unit", https://www.thermoking.com/na/en/newsroom/2021/02-Feb/thermo-king-launches-all-electric-refrigeration-unit-.html, Feb. 25, 2021.

* cited by examiner

SYSTEM AND METHOD FOR OPERATING VARIABLE FREQUENCY DRIVE USING AC-POWER SOURCE IN TRANSPORT REFRIGERATION UNIT

CROSS-REFERENCE TO RELATED APPLICATION

This patent application claims the benefit of priority of U.S. Provisional Patent Application No. 63/375,928, filed on Sep. 16, 2022, which is incorporated by reference herein in its entirety.

TECHNICAL FIELD

This invention relates to the field of transport refrigeration units.

BACKGROUND

In trailer refrigeration units or container refrigeration units that are collectively known as transport refrigeration units (TRUs), operating and maintaining a variable frequency drive (VFD) using DC power is complex as well as costly. There is, therefore, a need to provide a simple, efficient, and cost-effective system and method where the compressor of TRU is driven by VFD that is operable using AC power supplied by AC power sources.

SUMMARY

Described herein is a system comprising a variable frequency drive (VFD) operatively connected between one or more AC power source and a compressor, and/or between the one or more AC power source and one or more fan associated with an evaporator, and/or a condenser. The VFD is configured to be operated by the one or more AC power sources. The VFD is operable to receive a 3-phase AC power having a first set of electrical attributes from at least one of the one or more AC power source, convert the received 3-phase AC power into AC power or DC power having a second set of electrical attributes and supply the AC or DC power having the second set of electrical attributes to the compressor and/or the one or more fan.

In one or more embodiments, the first set of electrical attributes associated with the one or more AC power source comprises a voltage range of 200 V to 650 V, a power range of 0.25 KW to 25 KW, and a frequency range of 10 Hz to 70 Hz.

In one or more embodiments, the one or more AC power source is an assembly comprising a diesel engine operatively coupled to a generator.

In one or more embodiments, the compressor, the one or more fan, and the assembly are associated with a transport refrigeration unit.

In one or more embodiments, the one or more AC power source is an electrical grid.

In one or more embodiments, the second set of electrical attributes associated with the power being supplied by the VFD is selected based on type of compressor motor and/or operating speed requirement of the compressor and/or the one or more fan, and wherein the operating speed of the compressor ranges from 500 to 10000 rotations per minute.

In one or more embodiments, the generator is configured to be electrically connected to the electrical grid and operable to supply power to the corresponding VFDs.

In one or more embodiments, the VFD is an AC-powered VFD that is air-cooled or liquid-cooled.

Also described herein is a transport refrigeration unit comprising a compressor, and a variable frequency drive (VFD) operatively connected between the compressor and one or more AC power source. The VFD is configured to be operated by the one or more AC power sources. The VFD is operable to receive 3-phase AC power having a first set of electrical attributes from at least one of the one or more AC power source, convert the received 3-phase AC power into an AC power or DC power having a second set of electrical attributes, and supply the AC or DC power having the second set of electrical attributes to the compressor to operate the compressor.

In one or more embodiments, the transport refrigeration unit comprises one or more fans associated with an evaporator, and a condenser, wherein the VFD is operatively connected between the one or more AC power source and the one or more fans. The VFD is configured to receive the 3-phase AC power having the first set of electrical attributes from at least one of the one or more AC power source, convert the received 3-phase AC power into an AC power and/or DC power having the second set of electrical attributes, and supply the AC or DC power having the second set of electrical attributes to the one or more fans.

In one or more embodiments, the one or more AC power source is an assembly comprising a diesel engine operatively coupled to a generator associated with the transport refrigeration unit.

In one or more embodiments, the one or more AC power source is an electrical grid, and the VFD is operatively connected to the electrical grid when the transport refrigeration unit is in standby mode.

In one or more embodiments, the second set of electrical attributes associated with the AC or DC power supplied by the VFD is selected based on type of compressor motor and/or the operating speed of the compressor and/or the one or more fan.

In one or more embodiments, the operating speed of the compressor and/or the one or more fan is selected based on a cooling requirement of the transport refrigeration unit.

Further described herein is a method comprising the steps of: operatively connecting an AC-powered variable frequency drive (VFD) between a compressor and one or more AC power source, and/or between the one or more AC power source and one of more fan associated with an evaporator, and condenser, wherein the VFD is configured to be operated by the one or more AC power sources; receiving, by the VFD, a 3-phase AC power having a first set of electrical attributes from at least one of the one or more AC power source; converting by the VFD, the received 3-phase AC power into an AC power or DC power having a second set of electrical attributes; and supplying the AC or DC power having the second set of electrical attributes to the compressor and/or the one or more fan.

In one or more embodiments, the one or more AC power source is an assembly comprising a diesel engine operatively coupled to a generator associated with a transport refrigeration unit (TRU), wherein the method comprises the step of receiving, by the VFD, the 3-phase AC power from the generator.

In one or more embodiments, the one or more AC power source is an electrical grid, wherein the method comprises the steps of: operatively connecting the VFD to the electrical grid when the TRU is in a standby mode, and receiving, by the VFD, the 3-phase AC power from the electrical grid or through the generator of the TRU.

The foregoing summary is illustrative only and is not intended to be in any way limiting. In addition to the illustrative aspects, embodiments, and features described above, further aspects, embodiments, features, and techniques of the invention will become more apparent from the following description taken in conjunction with the drawings.

BRIEF DESCRIPTION OF THE DRAWINGS

The accompanying drawings are included to provide a further understanding of the subject disclosure of this invention and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

Transport refrigeration units (TRUs) are equipped with a compressor connected to an evaporator. The compressor is generally driven by a liquid-cooled variable frequency drive (VFD) that is powered by a DC source such as a battery of the TRU. However, operating and maintaining the liquid-cooled VFD or DC-powered VFD using DC power is complex as well as costly. This invention provides a simple, efficient, and cost-effective system and method where the compressor is driven by VFD that is operable using AC power supplied by AC power sources such as a diesel engine and generator of the TRU and/or by an electrical grid.

Figure 1A:
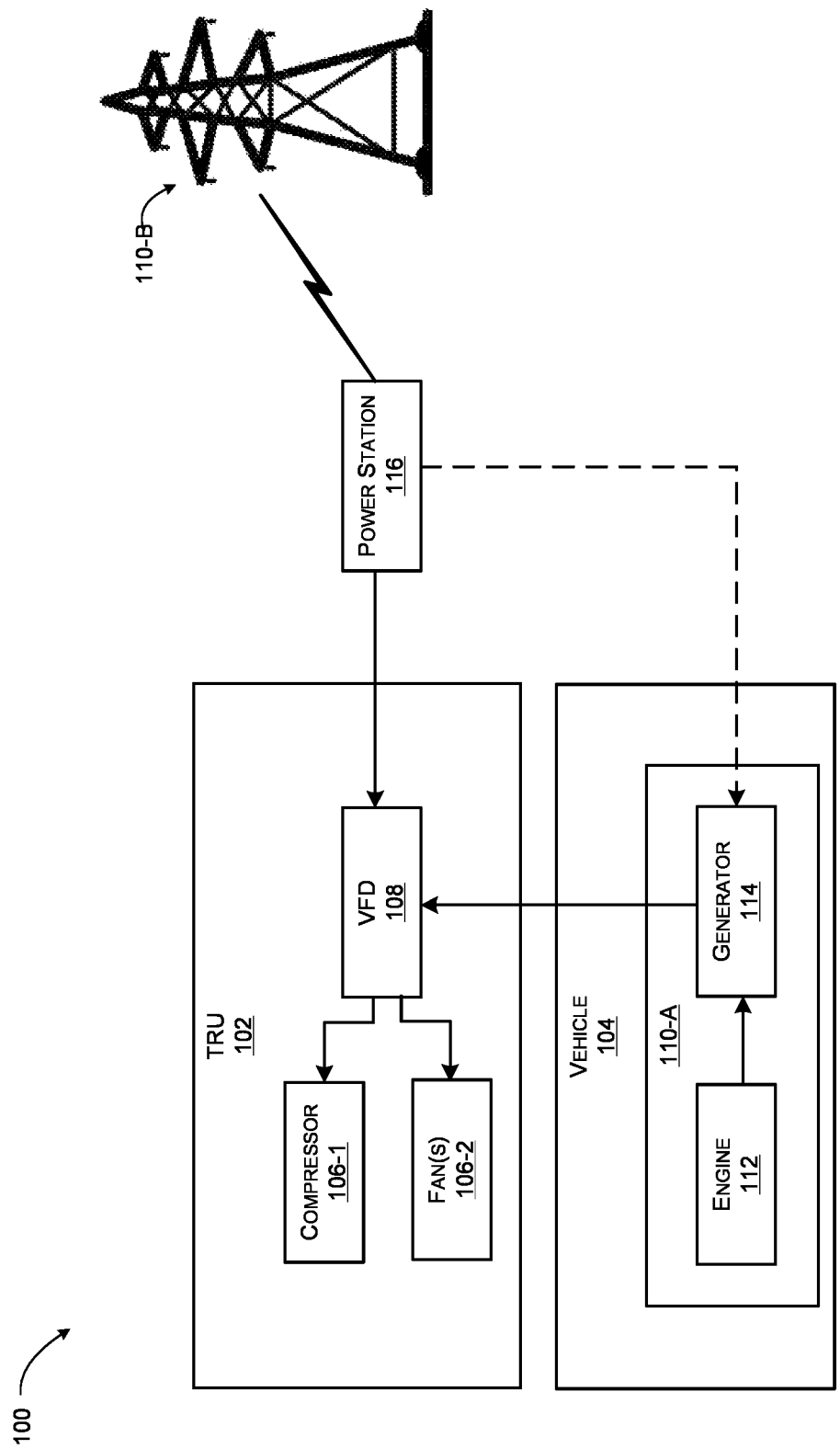
FIG. 1A illustrates an exemplary architecture of the system implemented in a transport refrigeration unit (TRU) in accordance with one or more embodiments of the disclosure.
Figure 1B:
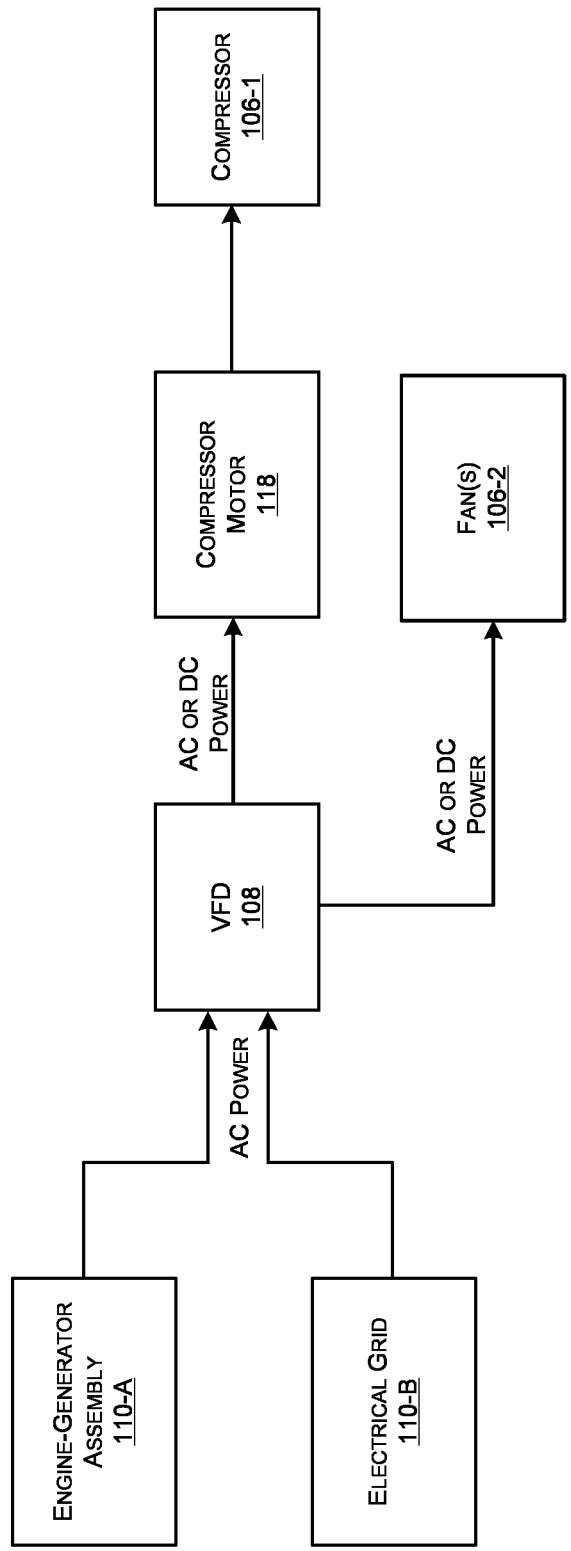
FIG. 1B illustrates an exemplary power flow diagram of the system of FIG. 1A in accordance with one or more embodiments of the disclosure.

Referring to FIGS. 1A and 1B, the system 100 implemented in a transport refrigeration unit (TRU) that may be a trailer refrigeration or truck refrigeration or a container refrigeration unit (collectively designated as TRU 102, herein) of a vehicle 104, for driving a compressor (also referred to as compressor 106-1, herein) or one or more fans (collectively designated as fan 106-2, herein) of the TRU 102 by an AC-powered variable frequency drive (VFD) 108 is disclosed, where the VFD 108 is operable using AC power source(s) 110-A and 110-B (collectively designated as 110, herein). The VFD 108 is AC-powered and may be an air-cooled VFD or a liquid-cooled VFD. The VFD 108 is adapted to be electrically connected between the AC power sources 110 and the compressor 106, and/or between the AC power sources 110 and the fan(s) 106-2 of the TRU 102. The fan 106-2 may be associated with an evaporator, and/or a condenser of the TRU 102. The VFD 108 is configured to be operated by the AC power received from the AC power sources 110. In one or more embodiments, the AC power source is an assembly 110-A comprising a diesel engine 112 operatively coupled to a generator 114, associated with the TRU 102, where the engine 112 is configured to drive the generator 114 to generate 3-phase AC power. Thus, the VFD 108 can directly receive 3-phase electrical power from the engine-generator assembly 110-A of the TRU 102. In addition, the AC power source can be an electrical grid 110-B, where one or more power stations 116 associated with the electrical grid 110-B are installed at various locations. The power stations 116 are configured to electrically connect the TRU 102 to the electrical grid 110-B. Once the TRU 102 is in standby mode at any of the power stations 116, the VFD 108 of the TRU 102 is electrically connected to the power station 116, which correspondingly connects the VFD 108 to the electrical grid 110-B, thereby allowing the electrical grid 110-B to supply 3-phase electrical power to the VFD 108. In one or more embodiments, the generator 114 of the TRU 102 can be configured to be directly electrically connected to the electrical grid 110-B as shown in dashed line in FIG. 1A. In such embodiments, the generator 114 can directly receive 3-phase electrical power from the electrical grid 110-B and supply AC power to the one or more VFDs 108 associated with the TRU 102.

The compressor 106 may be a variable speed compressor having a variable speed motor or a permanent magnet motor that provides power to a compressor head. An input side of the VFD 108 is connected to the AC power sources 110-A and 110-B and an output side of the VFD 108 is connected to the compressor 106 as shown in FIG. 1B. The compressor 106 and the motor 118 may be linked via an interconnecting drive shaft. The compressor 106, the compressor motor 118, and the drive shaft may all be sealed within a common housing. The compressor 106 may be a single or multiple compressors. The compressor 106 may be a two-stage compressor, a scroll-type compressor, a reciprocating compressor or other compressors adapted to compress refrigerants.

Further, an input side of the same or a different VFD 108 is connected to the AC power sources 110-A and 110-B and an output side of the corresponding VFD 108 is connected to the fan(s) 106-2 associated with the condenser, or the evaporator of the TRU 102 to facilitate cooling. If the same VFD 108 is used for the compressor 106-1 as well the fans, then the speeds of each of the fans 106-2 can be chosen separately or the same as the compressor.

The VFD 108 is operable to receive 3-phase AC power having a first set of electrical attributes from at least one of the AC power sources 110-A and/or 110-B and convert the received 3-phase AC power into an AC or DC power having a second set of electrical attributes. The VFD 108 supplies the AC or DC power having the second set of electrical attributes to the motor 118 of the compressor 106-1 to control the operation of the compressor 106-1. In addition, the VFD 108 further supplies the AC or DC power having the second set of electrical attributes to the fans 106-1 to control cooling of the evaporator, and/or the condenser. In one or more embodiments, the VFD 108 is configured to be operated by the AC power having (first set of electrical attributes) a voltage range of 200 V to 650 V, a power range of 0.25 KW to 25 KW, and a frequency range of 10 Hz to 70 Hz. The VFD 108 converts the received AC power into AC or DC power having the second set of electrical attributes based on type of compressor motor and the electrical power requirements of the compressor 106 and/or the fans. The generated AC or DC power is processed and tuned before being supplied to the compressor motor 118 or the fans 106-2. The AC or DC power, current and frequency supplied by the VFD 108 is selected based on type of compressor motor and/or the operating speed of the compressor 106, where the operating speed of the compressor 106 ranges from 500 to 10000 rotations per minute (RPM). Thus, the system 100 enables the compressor 106 to be operated in a wider range of AC power and at a wider range of operating speeds. In addition, the VFD 108 and compressor 106-1 can be driven by the engine-generator assembly 110-A of the TRU 102 as well as the electrical grid 110-B.

The TRU 102 is generally integrated into a cargo compartment and may be mounted to the front wall of the cargo compartment associated with the vehicle 104 or a transport refrigeration system (not shown). In other embodiments, the trailer refrigeration unit or the container refrigeration unit can be integrated into the cargo compartment by different means, for example, integrating partially or completely with the side walls or top of the container or trailer or at the back of the trailer. The cargo compartment is maintained at a desired temperature by cooling the cargo compartment by the TRU 102 that circulates airflow into and through the cargo compartment. The components of the TRU 102 include the compressor 106, the electric compressor motor 118, a condenser that is fluidically connected to the compressor by a refrigeration line, a condenser fan assembly for enabling air cooling of the condenser, a heat exchanger, an expansion valve, an evaporator, an evaporator fan assembly for cooling the evaporator, and a control unit that may include a computer-based processor (e.g., a microprocessor).

Operation of the TRU 102 may best be understood by starting at the compressor 106, where the suction gas, for example, a refrigerant gas, enters the compressor 106 at a suction port and is compressed to a higher temperature and pressure. The compressor motor 118 upon driven by the VFD 108 rotates at a speed in the range of 500 to 10000 rpm, which compresses the received refrigerant gas to a higher temperature and pressure. The refrigerant gas is then emitted from the compressor 106 at an outlet port and may then flow into tube(s) of the condenser. Air flowing across a plurality of condenser coil fins (not shown) and the tubes of the condenser cool the refrigerant gas to or below its saturation temperature. The airflow across the condenser may be facilitated by one or more fans of the condenser fan assembly. The condenser fans may be driven by respective condenser fan motors of the condenser fan assembly that may be driven by the VFD 108 or power source 110-A of the vehicle 104 or the electric grid 110-B.

By removing latent heat, the refrigerant gas within the tubes of the condenser condenses to a high-pressure and medium-temperature liquid and flows to a receiver that provides storage for excess liquid refrigerant during low-temperature operation. From the receiver, the liquid refrigerant may pass through a sub-cooler heat exchanger of the condenser, through the filter-dryer that keeps the refrigerant clean and dry, then to the heat exchanger that increases the refrigerant sub-cooling, and finally to the thermostatic or electronic expansion valve. As the liquid refrigerant passes through the orifice of the expansion valve, some of the liquid vaporizes into a gas (i.e., flash gas) as the pressure of the refrigerant drops.

Return air from the refrigerated space (i.e., cargo compartment) associated with the vehicle 104 flows over the heat transfer surface of the evaporator. As the refrigerant flows through a plurality of tubes of the evaporator, the remaining liquid refrigerant absorbs heat from the return air, and in so doing, is vaporized. As a result, return air from the cargo compartment gets cooled and is supplied back to the cargo compartment to keep the inner space of the cargo compartment of the vehicle 104 at the desired temperature. From the evaporator, the refrigerant, in vapor form, may then flow through the suction modulation valve, and back to the compressor 106.

Figure 2:
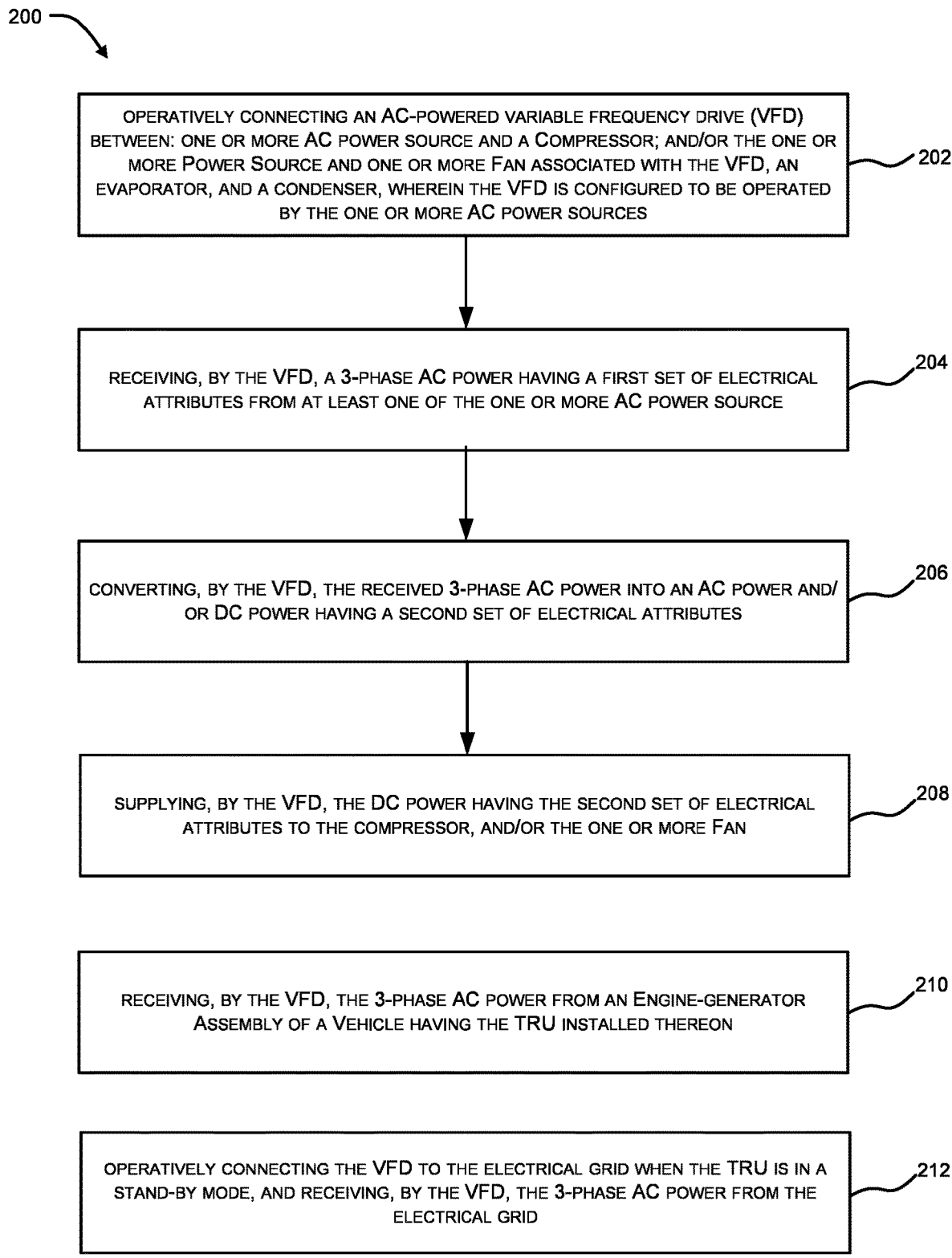
FIG. 2 is a flow diagram illustrating the steps involved in the method of operating a VFD using AC power in a TRU in accordance with one or more embodiments of the disclosure.

Referring to FIG. 2, the steps involved in the method for driving a compressor of the transport refrigeration unit by an AC-powered variable frequency drive (VFD) that is operable using AC power source(s) are disclosed. Method 200 includes step 202 of operatively connecting the VFD between a compressor of the TRU and one or more AC power source. Further, step 202 includes operatively connecting the same VFD or a different VFD between the one or more AC power source and one or more fans associated with the evaporator, and/or the condenser. An input side of the VFD is connected to the AC power sources and an output side of the VFD is connected to the motor of the compressor. Further, an input side of the same or a different VFD is connected to the AC power sources and an output side of the corresponding VFD is connected to the fan(s) of the TRU 102 to facilitate cooling. If the same VFD is used for the compressor as well the fans, then the speeds of each of the fans can be chosen separately or same as the compressor. In one or more embodiments, the AC power source can be an assembly comprising a diesel engine operatively coupled to a generator, associated with the TRU. In addition, the AC power source can be an electrical grid.

Method 200 further includes step 204 of receiving, by the VFD, a 3-phase AC power having a first set of electrical attributes from at least one of the AC power source, followed by step 206 of converting, by the VFD, the received 3-phase AC power into an AC or DC power having a second set of electrical attributes. Method 200 further includes step 208 of supplying, by the VFD, the AC or DC power having the second set of electrical attributes to the compressor and/or the fan(s). The VFD is configured to be operated by the AC power having (first set of electrical attributes) an AC voltage range of 200 V to 650 V, an AC power range of 0.25 KW to 25 KW, and a frequency range of 10 Hz to 70 Hz. The VFD converts the received AC power into AC or DC power having the second set of electrical attributes based on type of compressor motor and/or the electrical power requirements of the compressor. The generated AC or DC power is processed and tuned before being supplied to the compressor and/or the fans. The AC or DC power supplied by the VFD is selected based on the operating speed of the compressor, where the operating speed of the compressor ranges from 500 to 10000 rotations per minute (RPM).

In some embodiments, when the VFD is connected to the engine-generator assembly having the TRU installed thereon, method 200 includes step 210 of receiving, by the VFD, the 3-phase AC power from the generator of the vehicle, followed by performing steps 204 to 208 explained above.

In some embodiments, when the TRU is in standby mode at any of the power stations associated with the electrical grid, method 200 includes step 212 of operatively connecting the VFD of the TRU to the power station/electrical grid, followed by performing steps 204 to 208 explained above.

Thus, the system, transport refrigeration unit, or method overcomes the drawbacks, limitations, and shortcomings associated with existing technologies by providing a simple, efficient, and cost-effective system and method where the compressor and/or fans of the TRU is driven by VFD that is operable using AC power supplied by AC power sources such as a diesel engine and generator of the TRU and/or by an electrical grid.

It should be obvious to a person skilled in the art that while various embodiments of this invention have been elaborated for engine-generator assembly and the electrical grid as the AC power sources, however, the teachings of this invention are equally applicable for other AC power sources as well. In addition, while various embodiments of this invention have been elaborated for the system being implemented in the vehicle such as a transport refrigeration system, however, the teachings of this invention are equally applicable for refrigeration systems of other vehicles and/or buildings that require the operation of the compressor of the refrigeration system by an AC-powered VFD.

While the invention has been described with reference to exemplary embodiments, it will be understood by those skilled in the art that various changes may be made and equivalents may be substituted for elements thereof without departing from the scope of the invention as defined by the appended claims. Modifications may be made to adopt a particular situation or material to the teachings of the invention without departing from the scope thereof. Therefore, it is intended that the invention not be limited to the particular embodiment disclosed, but that the invention includes all embodiments falling within the scope of the invention as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. A system comprising:
a variable frequency drive (VFD) operatively connected between a first AC power source and a second AC power source,
wherein the VFD is configured to be operated by the first AC power source and the second AC power source, and the VFD is operable to:
receive a 3-phase AC power having a first set of electrical attributes from at least one of the first AC power source and the second AC power source;
convert the received 3-phase AC power into an AC and/or a DC power having a second set of electrical attributes; and
supply the AC power and/or the DC power having the second set of electrical attributes to a compressor and/or one or more fans.

2. The system of claim 1, wherein the first set of electrical attributes associated with said at least one of the first AC power source and the second AC power source comprises:
a voltage range of 200 V to 650 V;
a power range of 0.25 KW to 25 KW; and
a frequency range of 10 Hz to 70 Hz.

3. The system of claim 1, wherein the first AC power source is an assembly comprising a diesel engine operatively coupled to a generator, and wherein the compressor, the one or more fans, and the assembly are associated with a transport refrigeration unit.

4. The system of claim 1, wherein the second AC power source is an electrical grid.

5. The system of claim 1, wherein the second set of electrical attributes associated with the AC and/or the DC power being supplied by the VFD is selected based on a type of a compressor motor and/or an operating speed of the compressor and/or the one or more fans.

6. The system of claim 1, wherein the VFD is an AC-powered VFD that is air cooled or liquid cooled.

7. The system of claim 1, wherein the first AC power source is configured to receive the 3-phase AC power directly from the second AC power source, and wherein the first AC power source is configured to supply the received 3-phase AC power to the VFD.

8. The system of claim 1, wherein an input of the VFD is connected to the first AC power source and the second AC power source, and an output of the VFD is connected to the compressor and the one or more fans.

9. The system of claim 5, wherein the operating speed of the compressor ranges from 500 to 10000 rotations per minute.

10. A transport refrigeration unit comprising:
a compressor; and
a variable frequency drive (VFD) operatively connected between the compressor and one or more AC power source,
wherein the VFD is configured to be operated by the one or more AC power sources, and the VFD is operable to:
receive a 3-phase AC power having a first set of electrical attributes from at least one of the one or more AC power source;
convert the received 3-phase AC power into an AC power and/or DC power having a second set of electrical attributes; and
supply the AC or DC power having the second set of electrical attributes to the compressor to operate the compressor.

11. The transport refrigeration unit of claim 10 further comprising:
one or more fan associated with an evaporator, and/or a condenser;
wherein the VFD is operatively connected between the one or more AC power source and the one or more fan, and the VFD is configured to:
receive the 3-phase AC power having the first set of electrical attributes from at least one of the one or more AC power source;
convert the received 3-phase AC power into an AC power and/or DC power having the second set of electrical attributes; and
supply the AC or DC power having the second set of electrical attributes to the one or more fan.

12. The transport refrigeration unit of claim 10, wherein the first set of electrical attributes associated with the one or more AC power source comprises:
- a voltage range of 200 V to 650 V;
- a power range of 0.25 KW to 25 KW; and
- a frequency range of 10 Hz to 70 Hz.

13. The transport refrigeration unit of claim 10, wherein the one or more AC power source is an assembly comprising a diesel engine operatively coupled to a generator, wherein the assembly is associated with the TRU.

14. The transport refrigeration unit of claim 10, wherein the one or more AC power source is an electrical grid, and wherein the VFD is operatively connected to the electrical grid when the transport refrigeration unit is in standby mode.

15. The transport refrigeration unit of claim 10, wherein the second set of electrical attributes associated with the power supplied by the VFD is selected based on type of compressor motor and/or operating speed of the compressor and/or the one or more fans.

16. The transport refrigeration unit of claim 10, wherein the generator is configured to be electrically connected to the electrical grid and operable to supply power to the corresponding VFDs.

17. The transport refrigeration unit of claim 15, wherein the operating speed of the compressor and/or the one or more fans is selected based on a cooling requirement of the transport refrigeration unit, and wherein the operating speed of the compressor range from 500 to 10000 rotations per minute.

18. A method comprising the steps of:
- operatively connecting an AC-powered variable frequency drive (VFD) between a first AC power source and a second AC power source,
- wherein the VFD is configured to be operated by the first AC power source and the second AC power source;
- receiving, by the VFD, a 3-phase AC power having a first set of electrical attributes from at least one of first AC power source and the second AC power source;
- converting, by the VFD, the received 3-phase AC power into an AC power and/or a DC power having a second set of electrical attributes; and
- supplying, by the VFD, the AC power and/or the DC power having the second set of electrical attributes to a compressor and/or one or more fans.

19. The method of claim 18, wherein the first AC power source is an assembly comprising a diesel engine operatively coupled to a generator, associated with a transport refrigeration unit (TRU), and wherein the method comprises the step of receiving, by the VFD, the 3-phase AC power from the generator.

20. The method of claim 19, wherein the second AC power source is an electrical grid, and wherein the method comprises the steps of:
- operatively connecting the VFD to the electrical grid when the TRU is in a standby mode; and
- receiving, by the VFD, the 3-phase AC power from the electrical grid and/or the generator of the TRU.

* * * * *